United States Patent
Hughes et al.

(10) Patent No.: US 11,430,442 B2
(45) Date of Patent: Aug. 30, 2022

(54) CONTEXTUAL HOTWORDS

(71) Applicant: Google LLC, Mountain View, CA (US)

(72) Inventors: Christopher Thaddeus Hughes, Redwood City, CA (US); Ignacio Lopez Moreno, Brooklyn, NY (US); Aleksandar Kracun, New York, NY (US)

(73) Assignee: Google LLC, Mountain View, CA (US)

( * ) Notice: Subject to any disclaimer, the term of this patent is extended or adjusted under 35 U.S.C. 154(b) by 40 days.

(21) Appl. No.: 17/068,681

(22) Filed: Oct. 12, 2020

(65) Prior Publication Data

US 2021/0043210 A1  Feb. 11, 2021

Related U.S. Application Data

(63) Continuation of application No. 16/362,831, filed on Mar. 25, 2019, now Pat. No. 10,839,803, which is a
(Continued)

(51) Int. Cl.
*G10L 15/22* (2006.01)
*G10L 15/02* (2006.01)
(Continued)

(52) U.S. Cl.
CPC .............. *G10L 15/22* (2013.01); *G10L 15/02* (2013.01); *G10L 15/08* (2013.01); *G10L 15/20* (2013.01);
(Continued)

(58) Field of Classification Search
CPC ......... G10L 15/22; G10L 15/02; G10L 15/08; G10L 15/20; G10L 2015/088;
(Continued)

(56) References Cited

U.S. PATENT DOCUMENTS 8,380,521 B1    2/2013  Maganti et al.
8,719,039 B1 *  5/2014  Sharifi .................... G10L 15/02
                                                   704/251
(Continued)

FOREIGN PATENT DOCUMENTS

JP    2004516517 A    6/2004
JP    2016218852 A   12/2016
(Continued)

OTHER PUBLICATIONS

Korean Office Action, Application No. 10-2019-7021993, dated Dec. 27, 2020, 13 pages.
(Continued)

*Primary Examiner* — Thuykhanh Le
(74) *Attorney, Agent, or Firm* — Honigman LLP; Brett A. Krueger

(57) ABSTRACT

Methods, systems, and apparatus, including computer programs encoded on a computer storage medium, for contextual hotwords are disclosed. In one aspect, a method, during a boot process of a computing device, includes the actions of determining, by a computing device, a context associated with the computing device. The actions further include, based on the context associated with the computing device, determining a hotword. The actions further include, after determining the hotword, receiving audio data that corresponds to an utterance. The actions further include determining that the audio data includes the hotword. The actions further include, in response to determining that the audio data includes the hotword, performing an operation associated with the hotword.

20 Claims, 3 Drawing Sheets

Related U.S. Application Data continuation of application No. 15/391,358, filed on Dec. 27, 2016, now Pat. No. 10,276,161.

(51) Int. Cl.
 *G10L 15/08* (2006.01)
 *G10L 15/20* (2006.01)

(52) U.S. Cl.
 CPC .. *G10L 2015/088* (2013.01); *G10L 2015/223* (2013.01); *G10L 2015/226* (2013.01); *G10L 2015/228* (2013.01)

(58) Field of Classification Search
 CPC ......... G10L 2015/223; G10L 2015/226; G10L 2015/228
 USPC ........................................................ 704/251
 See application file for complete search history.

(56) References Cited

U.S. PATENT DOCUMENTS

| | | | |
|---|---|---|---|
| 8,924,219 B1* | 12/2014 | Bringert | G10L 15/183 704/275 |
| 8,938,394 B1* | 1/2015 | Faaborg | G10L 15/22 704/274 |
| 9,263,035 B2 | 2/2016 | Sharifi | |
| 9,437,188 B1* | 9/2016 | Medina | G10L 15/22 |
| 9,633,661 B1 | 4/2017 | Typrin et al. | |
| 9,697,828 B1* | 7/2017 | Prasad | G10L 15/08 |
| 9,819,905 B1* | 11/2017 | Breitbard | H04L 65/1076 |
| 10,276,161 B2 | 4/2019 | Hughes et al. | |
| 2002/0169600 A1* | 11/2002 | Busayapongchai | G10L 15/22 704/E15.04 |
| 2002/0181691 A1 | 12/2002 | Miller et al. | |
| 2002/0198710 A1* | 12/2002 | Hernandez-Abrego | G10L 15/10 704/240 |
| 2003/0185410 A1* | 10/2003 | June | H04R 1/406 381/94.1 |
| 2003/0200086 A1* | 10/2003 | Kawazoe | G10L 15/20 704/239 |
| 2003/0212562 A1 | 11/2003 | Patel et al. | |
| 2003/0236664 A1* | 12/2003 | Sharma | G10L 15/08 704/251 |
| 2004/0054539 A1* | 3/2004 | Simpson | H04M 1/724 704/E15.047 |
| 2004/0193426 A1* | 9/2004 | Maddux | G10L 17/00 704/E15.045 |
| 2004/0215458 A1* | 10/2004 | Kobayashi | G10L 15/06 704/251 |
| 2005/0033582 A1 | 2/2005 | Gadd et al. | |
| 2005/0203740 A1 | 9/2005 | Chambers et al. | |
| 2007/0016426 A1* | 1/2007 | Hershey | G10L 15/26 704/277 |
| 2007/0081636 A1 | 4/2007 | Shaffer et al. | |
| 2007/0135187 A1 | 6/2007 | Kreiner et al. | |
| 2008/0059191 A1* | 3/2008 | Huang | G10L 15/30 704/E15.047 |
| 2008/0133245 A1 | 6/2008 | Proulx et al. | |
| 2008/0165937 A1 | 7/2008 | Moore | |
| 2009/0215503 A1 | 8/2009 | Zhang et al. | |
| 2010/0004924 A1* | 1/2010 | Paez | G06F 40/35 704/9 |
| 2010/0161335 A1 | 6/2010 | Whynot | |
| 2012/0089392 A1* | 4/2012 | Larco | G10L 15/22 704/E21.001 |
| 2013/0080177 A1* | 3/2013 | Chen | G10L 15/22 704/275 |
| 2013/0124194 A1* | 5/2013 | Nadal | G06F 40/40 704/9 |
| 2013/0204622 A1* | 8/2013 | Lu | H04M 1/72403 704/251 |
| 2013/0219333 A1* | 8/2013 | Palwe | H04M 1/72403 715/810 |
| 2013/0246050 A1* | 9/2013 | Yu | G10L 21/00 704/9 |
| 2013/0253933 A1* | 9/2013 | Maruta | G10L 15/00 704/246 |
| 2014/0006028 A1* | 1/2014 | Hu | G10L 17/04 704/251 |
| 2014/0025379 A1* | 1/2014 | Ganapathiraju | G10L 15/08 704/E15.046 |
| 2014/0095172 A1* | 4/2014 | Cabaco | G10L 21/06 704/275 |
| 2014/0095173 A1* | 4/2014 | Lynch | G06F 3/167 704/275 |
| 2014/0122085 A1 | 5/2014 | Piety et al. | |
| 2014/0249817 A1* | 9/2014 | Hart | G10L 15/22 704/239 |
| 2014/0337031 A1* | 11/2014 | Kim | G10L 15/08 704/256.5 |
| 2014/0379334 A1* | 12/2014 | Fry | G10L 15/22 704/235 |
| 2015/0012279 A1* | 1/2015 | Kim | G10L 25/48 704/275 |
| 2015/0039311 A1* | 2/2015 | Clark | G10L 15/063 704/244 |
| 2015/0142438 A1* | 5/2015 | Dai | G10L 17/02 704/275 |
| 2015/0161990 A1* | 6/2015 | Sharifi | G10L 15/063 704/251 |
| 2015/0161997 A1* | 6/2015 | Wetsel | G06F 3/167 704/275 |
| 2015/0162002 A1* | 6/2015 | Liu | G10L 15/1822 704/235 |
| 2015/0199961 A1* | 7/2015 | Arkko | G06F 3/167 704/251 |
| 2015/0248885 A1* | 9/2015 | Koulomzin | G10L 15/08 704/251 |
| 2015/0302847 A1* | 10/2015 | Yun | G10L 15/07 704/251 |
| 2015/0302855 A1* | 10/2015 | Kim | G10L 15/22 704/275 |
| 2016/0042735 A1* | 2/2016 | Vibbert | G10L 15/1822 704/257 |
| 2016/0071516 A1* | 3/2016 | Lee | G10L 15/18 704/251 |
| 2016/0077794 A1* | 3/2016 | Kim | G10L 15/20 704/275 |
| 2016/0104480 A1 | 4/2016 | Sharifi | |
| 2016/0104482 A1* | 4/2016 | Aleksic | G10L 19/00 704/235 |
| 2016/0104486 A1* | 4/2016 | Penilla | G10L 15/02 704/232 |
| 2016/0118039 A1* | 4/2016 | Moon | G10L 15/22 704/239 |
| 2016/0133254 A1* | 5/2016 | Vogel | G06F 16/24578 704/275 |
| 2016/0140962 A1 | 5/2016 | Sharifi | |
| 2016/0171976 A1* | 6/2016 | Sun | H04W 52/0251 704/254 |
| 2016/0267913 A1* | 9/2016 | Kim | G10L 15/22 |
| 2017/0169817 A1* | 6/2017 | VanBlon | G10L 15/02 |
| 2017/0213559 A1* | 7/2017 | Agrawal | G10L 15/22 |
| 2017/0236148 A1* | 8/2017 | James | G06F 16/335 705/14.45 |
| 2017/0256255 A1* | 9/2017 | Bocklet | G10L 15/193 |
| 2018/0061403 A1* | 3/2018 | Devaraj | G06F 3/167 |
| 2018/0101533 A1* | 4/2018 | Robichaud | H04L 51/02 |
| 2018/0122372 A1* | 5/2018 | Wanderlust | G06F 3/167 |
| 2018/0158454 A1* | 6/2018 | Campbell | G06Q 20/32 |

(56) References Cited

U.S. PATENT DOCUMENTS

2018/0182388 A1\* 6/2018 Bocklet .................. G10L 15/02
2018/0182390 A1   6/2018 Hughes et al.
2019/0311715 A1\* 10/2019 Pfeffinger ............... G06F 3/167

FOREIGN PATENT DOCUMENTS

| JP | 2020172546 A  | 10/2020 |
| KR | 20160145634 A | 12/2016 |
| WO | 2013053798 A1 | 4/2013  |
| WO | 2015160586 A1 | 10/2015 |

OTHER PUBLICATIONS

JP Office Action in Japanese Appln. No. 2019-540550, dated Nov. 18, 2019, 10 pages (with machine translation).
International Search Report and Written Opinion issued in International Application No. PCT/US2017/044918, dated Nov. 7, 2017, 13 pages.
International Preliminary Report on Patentability issued in International Application No. PCT/US2017/044918, dated Nov. 22, 2018, 15 pages.
Japanese Patent Office, Office Action for Application 2020-172546, dated Nov. 12, 2021.

\* cited by examiner

CONTEXTUAL HOTWORDS

CROSS-REFERENCE TO RELATED APPLICATIONS

This U.S. patent application is a continuation of, and claims priority under 35 U.S.C. § 120 from, U.S. patent application Ser. No. 16/362,831, filed on Mar. 25, 2019, which is a continuation of U.S. patent application Ser. No. 15/391,358, filed on Dec. 27, 2016. The disclosures of these prior applications are considered part of the disclosure of this application and are hereby incorporated by reference in their entireties.

FIELD

This specification generally relates to automated speech recognition.

BACKGROUND

The reality of a speech-enabled home or other environment—that is, one in which a user need only speak a query or command out loud and a computer-based system will field and answer the query and/or cause the command to be performed—is upon us. A speech-enabled environment (e.g., home, workplace, school, etc.) can be implemented using a network of connected microphone devices distributed throughout the various rooms or areas of the environment. Through such a network of microphones, a user has the power to orally query the system from essentially anywhere in the environment without the need to have a computer or other device in front of him/her or even nearby. For example, while cooking in the kitchen, a user might ask the system "how many milliliters in three cups?" and, in response, receive an answer from the system, e.g., in the form of synthesized voice output. Alternatively, a user might ask the system questions such as "when does my nearest gas station close," or, upon preparing to leave the house, "should I wear a coat today?"

Further, a user may ask a query of the system, and/or issue a command, that relates to the user's personal information. For example, a user might ask the system "when is my meeting with John?" or command the system "remind me to call John when I get back home."

SUMMARY

For a speech-enabled system, the user's manner of interacting with the system is designed to be primarily, if not exclusively, by means of voice input. Consequently, the system, which potentially picks up all utterances made in the surrounding environment including those not directed to the system, must have some way of discerning when any given utterance is directed at the system as opposed e.g., to being directed an individual present in the environment. One way to accomplish this is to use a hotword, which by agreement among the users in the environment, is reserved as a predetermined word that is spoken to invoke the attention of the system. In an example environment, the hotword used to invoke the system's attention are the words "OK computer." Consequently, each time the words "OK computer" are spoken, it is picked up by a microphone, conveyed to the system, which performs speech modeling techniques to determine whether the hotword was spoken and, if so, awaits an ensuing command or query. Accordingly, utterances directed at the system take the general form [HOTWORD] [QUERY], where "HOTWORD" in this example is "OK computer" and "QUERY" can be any question, command, declaration, or other request that can be speech recognized, parsed and acted on by the system, either alone or in conjunction with the server via the network.

In cases where the user provides several hotword based commands to a speech-enabled system, such as a mobile phone, the user's interaction with the phone may become awkward. The user may speak, "Ok computer, play my homework playlist." The phone may begin to play the first song on the playlist. The user may wish to advance to the next song and speak, "Ok computer, next." To advance to yet another song, the user may speak, "Ok computer, next," again. To alleviate the need to keep repeating the hotword, the phone may be configured to recognize just "next" as both the hotword and the query, or in this instance, a command. With this feature, the user's interaction with the phone and the music application becomes more natural as the user only needs to speak "next" to advance to the next song instead of "Ok computer, next."

To accomplish this, the speech-enabled system determines a current context of the system and identifies related hotwords. The context may be based on an application that is running on the system, the location of the system, the movement of the system, or any other similar situation. The system may use the context of the system to identify additional hotwords. For example, when music is playing, the system may identify the hotwords "next," "stop," and "back" for controlling the music. The system may request a hotword model for each of the identified hotwords. The system may use the hotword models to recognize the new hotwords by processing the audio characteristics of audio data corresponding to the user's speech and applying the hotword models to the audio characteristics. The system recognizes a spoken hotword, and performs the corresponding operation. If the user speaks "stop" and "stop" is an active hotword because the system is playing music, then the system may stop playing music.

According to an innovative aspect of the subject matter described in this application, a method for rollback resistant security includes the actions of determining, by a computing device, a context associated with the computing device; based on the context associated with the computing device, determining a hotword; after determining the hotword, receiving audio data that corresponds to an utterance; determining that the audio data includes the hotword; and in response to determining that the audio data includes the hotword, performing an operation associated with the hotword.

These and other implementations can each optionally include one or more of the following features. The action of determining that the audio data includes the hotword includes determining that the audio data includes the hotword without preforming speech recognition on the audio data. The action of determining that the audio data includes the hotword includes extracting audio features of the audio data that corresponds to the utterance; generating a hotword confidence score by processing the audio features; determining that the hotword confidence score satisfies a hotword confidence threshold; and, based on determining that the hotword confidence score satisfies a hotword confidence threshold, determining that the audio data that corresponds to the utterance includes the hotword. The actions further include after determining the hotword, receiving a hotword model that corresponds to the hotword. The action of determining that the audio data includes the hotword includes determining, using the hotword model, that the audio data includes the hotword.

The action of identifying, by the computing device, an application that is running on the computing device. The context is based on the application that is running on the computing device. The actions further include determining, by the computing device, that the context is no longer associated with the computing device; and determining that subsequently received audio data that includes the hotword is not to trigger an operation. The actions further include providing, for output, data identifying the hotword. The actions further include identifying, by the computing device, movement of the computing device. The context is based on the movement of the computing device. The actions further include identifying, by the computing device, a location of the computing device. The context is based on the location of the computing device. The action of performing an operation associated with the hotword includes performing speech recognition on a portion of the audio data that does not include the hotword. The operation is based on a transcription of the portion of the audio that does not include the hotword. The audio data only includes the hotword. An initial portion of the audio data includes the hotword.

Other embodiments of this aspect include corresponding systems, apparatus, and computer programs recorded on computer storage devices, each configured to perform the operations of the methods.

The subject matter described in this application may have one or more of the following advantages. A computing device may recognize and act in response to shorter commands that would typically require the user to speak a hotword followed by the command. A computing device may be able to recognize and act in response to different commands without performing speech recognition on the commands. A computing device may also reduce computing resources required and battery power needed to recognize a query and a command because with the computing device may recognize a query and a command in one term.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

In the drawings, like reference numbers represent corresponding parts throughout.

DETAILED DESCRIPTION

Figure 1:
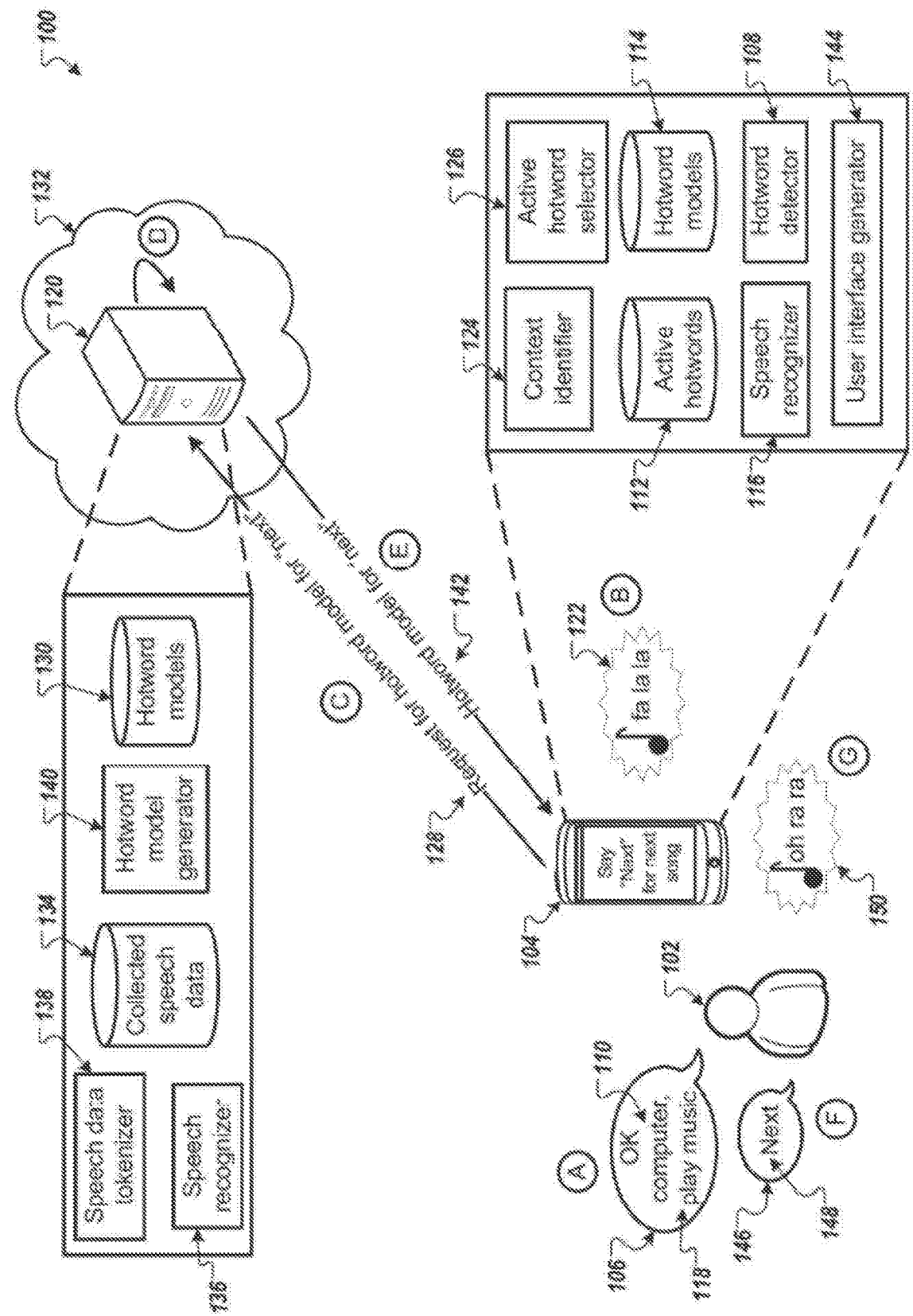
FIG. 1 illustrates an example system for identifying and processing contextual hotwords.

FIG. 1 illustrates an example system 100 for identifying and processing contextual hotwords. Briefly, and as described in more detail below, the computing device 104 begins to play music in response to the utterance 106, "Ok computer, play music." The computing device 104 begins to play music, and the computing device 104 is able to recognize the additional hotword "next" as an instruction to advance to the next song.

In more detail and beginning at stage A in FIG. 1, the user 102 speaks the utterance 106, "Ok computer, play music" in the vicinity of the computing device 104. A microphone of the computing device 104 receives the utterance 104 and processes the audio data that corresponds to the utterance. The initial processing of the audio data may involve filtering the audio data and converting the audio data from an analog signal to a digital signal.

As the computing device 104 processes the audio data, the computing device may store the audio data in a buffer for additional processing. With the audio data in the buffer, the computing device 104 may identify whether the audio data includes any spoken words. One way the computing device 104 identifies spoken words is to use a hotword detector 108. The hotword detector 108 is configured to identify hotwords that are included in the audio data.

In some implementations, the hotword detector 108 may be configured to identify hotwords that are in the initial portion of the utterance 106. In this example, the hotword detector 108 may determine that the utterance 106 "Ok computer, play music" includes the hotword 110 "ok computer" if the hotword detector 108 detects acoustic features in the audio data that are characteristic of an active hotword 112. The acoustic features may be mel-frequency cepstral coefficients (MFCCs) that are representations of short-term power spectrums of the utterance or may be mel-scale filterbank energies for the utterance 106. For example, the hotword detector 108 may detect that the utterance 106 "Ok computer, play music" includes the hotword 110 "ok computer" based on generating MFCCs from the audio data and classifying that the MFCCs include MFCCs that are similar to MFCCs that are characteristic of the hotword "ok computer" as stored in the hotword models 114. As another example, the hotword detector 108 may detect that the utterance 106 "Ok computer, play music" includes the hotword 110 "ok computer" based on generating mel-scale filterbank energies from the audio data and classifying that the mel-scale filterbank energies include mel-scale filterbank energies that are similar to mel-scale filterbank energies that are characteristic of the hotword "ok computer" as stored in the hotword models 114.

The hotword detector 108 determines that the audio data that corresponds to the utterance 106 includes the hotword 110, and the computing device 104 may perform speech recognition or semantic interpretation on the audio data that corresponds to the utterance 106. The speech recognizer 116 may perform speech recognition on the portion of the audio data that follows the hotword 110. In this example, the speech recognizer 116 may identify the words 118 "play music."

In some implementations, the speech recognizer 116 may not be located on the computing device 104. Instead, the computing device 104 provides the audio data that corresponds to the portion of the utterance 106 after the hotword 110 to a server, for example, server 120. The server 120 performs speech recognition and returns a transcription of the audio data to the computing device 104. The computing device 104 identifies the words in the utterance 106, and the computing device performs semantic interpretation and identifies any speech commands. The computing device 104 identifies the command and executes the command. In this example and in stage B, the computing device 104 beings to play music 122 upon identifying the "play music" command 118.

With the music playing 122 the computing device 104 is running a music application in either the foreground or the background. The computing device 104 may include a context identifier 124 and an active hotword selector 126. The context identifier 124 may be configured to identify a current context of the computing device 104. The active hotword selector 126 may use the current context of the computing device 104 to select active hotwords. In this example, the context of the device may be related to playing music 122 and running the music application. The active hotword selector 126 may examine the code of the music application to identify any hotwords that the developers of the music application want users to be able to speak to interact with the music application and the respective actions for each hotword. The music application may identify hotwords such as "play," "next," "stop," and "back." Based on the context of music actively playing the active hotword selector 126 may select the hotwords of "next," "stop," and "back" and store them in the active hotwords 112.

In some implementations, the context identifier 124 may use the location of the computing device 104 to determine the context. For example, the context identifier 124 may determine that the location corresponds to the home of the user 102 of the computing device 104. The active hotword selector 126 may use the context that the device is at the home of the user 102 to identify hotwords such as "warmer" and "cooler" to allow the user to control the temperature of the home. Similar to the example above, the active hotword selector 126 may store the "warmer" and "cooler" hotwords in the active hotwords 112 while the user 102 is at home.

In some implementations, the context identifier 124 may use the motion of the computing device 104 to determine the context. For example, the context identifier 124 may determine that the movement of the computing device 104 corresponds to the speed and motion of a typical vehicle. The context identifier 124 may also compare the speed and motion of the computing device 104 to determine whether the computing device 104 is moving along a road to increase the confidence that the computing device 104 is in a vehicle. In this instance, the active hotword selector 126 may use the context of computing device to identify the hotword "directions" to allow the user to request directions to a particular location. The active hotword selector 126 may store the hotword "directions" in the active hotwords 112 while the computing device 104 is in the vehicle.

In some implementations, the context identifier 124 may use the day or time or both to determine the context. For example, the context identifier 124 may determine that the context corresponds to the evening hours, such as between 9:00 pm and midnight. In this instance, the active hotword selector 126 may use the context of evening hours to identify the hotword "set alarm" to allow the user 102 to set an alarm. The active hotword selector 126 may store the hotword "set alarm" in the active hotwords 112 during the 9:00 pm to midnight time period.

In some implementations, the context identifier 124 may use the past actions and patterns of the user 102 to identify hotwords. The context identifier 124 may identify actions that the user typically performs, perhaps at different times of the day, and determine a context based on those actions. The active hotword selector 126 may identify related hotwords and store those hotwords in the active hotwords 112 during the corresponding time period. For example, the context identifier 124 may determine that the user 102 reads the news on the computing device 104 during the hours of 8:00 am to 10:00 am. The active hotword selector 126 may select "news" as an active hotword 112. With "news" as a hotword, the user 102 may say "news" to open the news application during the hours of 8:00 am to 10:00 am. The news application may have its own corresponding hotwords. The active hotword selector 126 may identify hotwords such a "sports," "local," and "national" as active hotwords 112 when the news application is open on the computing device 104.

In some implementations, the context identifier 124 may identify past actions that may not necessarily be time dependent. For example, the user 102 may habitually check the weather on the computing device 102. The context identifier 124 may determine that the context of the computing device almost always corresponds a time when the user 102 has checked the weather. In this case, the active hotword selector 126 may identify the hotword "weather" and store the hotword in the active hotwords 112. With "weather" as an active hotword, the user 102 just speaks "weather" to open a weather application and check the weather.

In some implementations, the context identifier 124 may determine a context based on a state of the computing device 104. For example, the state of the computing device 104 may be "locked." In this case, the active hotword selector 126 may identify the hotword "unlock" and store the hotword in the active hotwords 112 when the device is locked. With "unlock" as an active hotword, the user speaks "unlock" to unlock the phone. In order to improve security, the computing device 104 may use speaker identification techniques to verify that the speaker is the user 102. In this case, a corresponding hotword model would be trained using speech of the user 102. For example, the computing device 104 may prompt the user 102 to speak "unlock" several times so that the computing device 104 or server 120 can build a hotword model specific to user 102 with the speech samples.

The active hotwords 112 include a new hotword, and the computing device 104 may check the hotword models 114 to determine if the computing device 104 has a hotword for the newly added hotword. For example, the computing device 104 may check whether the hotword models 114 includes a hotword model for "next" when the active hotword selector 126 stores "next" in the active hotwords 112. If the hotword model for "next" is in the hotword models 114, then the hotword detector 108 can begin detecting the hotword "next," and the computing device 104 can skip stages C, D, and E. If the hotword model for "next" is not in the hotword models 114, then the computing device 104, in stage C, sends a request 128 to server 120 for the hotword model for "next."

In some implementations, the computing device 104 may request a hotword model for a hotword word that already has a corresponding hotword model in the hotword models 114. The computing device 104 may request a hotword model periodically, such as once per week, to ensure that the locally stored hotword model is as accurate as possible. The computing device 104 may also request a hotword model in response to feedback from the user 102. In some instances, the user 102 may speak a hotword such as "next" and the computer may not advance the song. The hotword detector 108 may process the audio data corresponding to "next" but may not identify the hotword because the hotword confidence score did not satisfy a threshold.

The user 102 may advance the song by selecting the next song button on the computing device 104. When the computing device 104 detects this series of actions, the computing device 104 may request an undated hotword model for "next." Alternatively, the computing device 104 may update the hotword model for "next" using the audio data that did not generate a hotword confidence score that satisfy the threshold but was above a lower hotword confidence threshold. In some implementations, the computing device 104 may calculate a noise level for the audio data that did not generate a hotword confidence score that satisfy the threshold. If the noise level is greater than a noise threshold, then the computing device 104 may not update the hotword model with the corresponding audio data since it may have too much background noise.

The server 120 receives the request 128 for the hotword model and identifies the corresponding hotword model 130 in stage D. The server 120 may correspond to one or more servers that are accessible through a network 132 such as the internet. The data accessible by one server may be accessible by other servers. In addition to identifying and providing hotword models, the server 120 is configured to receive audio data and generate hotword models 130 based on the received audio data.

To generate hotword models 130, the server 120 receives and collects speech data 134. The server 120 may receive speech data 134 from servers that perform speech recognition. The servers may perform the speech recognition and provide the audio data to the server 120 to generate hotword models. With the collected speech data 134, the speech recognizer 136 identifies the words in the collected speech data.

The speech recognizer 136 provides the transcription and the speech data to the speech data tokenizer 138. The speech data tokenizer 138 segments the audio data into portions that correspond to different words. For example, if the collected speech data 134 corresponds to the words "play the next song," then the speech recognizer generated the transcription of "play the next song" and the speech data tokenizer 138 tokenizes the audio data into four sections. There is one section for "play," another section for "the," another section for "next," and another section for "song."

The speech recognizer 136 and speech data tokenizer 138 may tokenize many speech samples and provide the tokenized speech samples to the hotword model generator 140. The hotword model generator 140 processes multiple samples of the same word to generate a hotword model for that word. For example, the hotword model generator 140 may receive multiple speech samples that correspond to the word "next." The hotword model generator 140 extracts the audio characteristics of the speech sample to generate the hotword model for "next." The hotword model generator 140 stores the hotword model for "next" in the hotword models 130.

The hotword models 130 are ready for the server 120 to provide to computing devices to recognize those particular hotwords. In some implementations the server 120 may not have the requested hotword in the hotword models 130. In this case, the server 120 may analyze the collected speech data 134 using the speech recognizer 136 and speech data tokenizer 138 to identify audio samples that correspond to the requested word. Alternatively, the server 120 may request that the computing device 104 collect samples. The computing device 104 may request the user to repeat a word several times. The computing device 104 may provide the audio data to the server 120 for processing to generate a hotword model. In some implementations, a requested hotword may be more than one word. In this instance, the hotword model generator 140 may combine hotword models 130 to generate a hotword model for the multiple word hotword.

In some implementations, the hotword model generator 140 may generate hotword models that include noise that is specific to a particular context. The hotword model generator 140 may not select all speech tokens that correspond to the target hotword. Instead, the hotword model generator 140 select that speech tokens that include background noise that is likely to exist in the corresponding context. For example, the hotword model generator 140 may generate a hotword model for "next" with speech tokens that include "next" and have background music. If the server 120 receives a request for the hotword model "next" and the request indicates that the context is music playing, then the server 120 may provide the hotword model of "next" that is configured for background music. If the server 120 receives a request for the hotword model "next" and the request indicates that the context is photo viewing, then the server 120 may provide the hotword model of "next" that is configured for no background noise.

In stage E, the server 120 provides the response 142 that includes the requested hotword model. In the example shown in FIG. 1, the server 120 provides a hotword model for "next" to the computing device 104. The computing device 104 stores the hotword model in the hotword word models 114 and may update an indicator in the active hotwords 112 to indicate that there is a corresponding hotword model stored on the computing device 104.

In some implementations, the active hotword selector 126 may remove hotwords from the active hotwords 112. When the context identifier 124 indicates that the context has changed, the active hotword selector 126 may update the active hotwords 112 based on the new context. Following some of the examples from above, the active hotword selector 126 may remove the hotword "news" from the active hotwords 112 after 10:00 am. Similarly, the active hotword selector 126 may remove the hotword "set alarm" after midnight and add the hotword "set alarm" back to the active hotwords 112 after 9:00 pm. In some implementations, the corresponding hotword model remains in the hotword models 114 when the active hotword selector 126 removes the hotword active hotwords 112.

In some implementations, the active hotword selector 126 may remove hotwords from the active hotwords 112 even when the same application is running on the computing device 104. When the computing device 104 executes the music application, the active hotword selector 126 may identify the hotwords "play," "next," "stop," and "back" and load the corresponding hotword models in the hotword models 114. In this instance, the hotwords need not be added to the active hotwords 112 for the computing device 104 to request a hotword model. With the music playing, the active hotword selector 126 may include the hotwords "next," "stop," and "back" as the active hotwords. If the music stops and the music application remains open, then the active hotword selector 126 may update the active hotwords 112 to "next," "play," and "back."

In some implementations the user interface generator 144 generates a user interface for display on the computing device 104. The user interface may indicate the active hotwords 112. For example, the user interface may indicate, when a song begins to play, for the user 102 to say "next," "stop," or "back" to control the music. When the music stops, the user interface may indicate that the user 102 can say "next," "play," and "back" to control the music. The user interface generator 144 may also generate a notification when a hotword is active.

For example, the user interface may indicate that the hotword set "alarm" is active when the current time reaches 9 pm. Similarly, the user interface may indicate that the hotword "set alarm" is no longer active when the current time reaches midnight. The user interface may also indicate the effect of speaking each hotword. For example, when the music application is active and the music is playing the user interface may indicate that "next" advances to the next song in the playlist, "stop" stops the current song from playing, and "back" returns to the previous song in the playlist.

In some implementations, the user interface generator 144 may also generate a user interface to control when different hotwords are active. The control interface may include the context when a hotword is active and allow the user to update the context when a hotword is active. Additionally or alternatively, the control interface may allow the user 102 to indicate the hotwords that are active for each context. For example, the control interface may indicate that the hotword "news" is active from 8:00 am to 10:00 am. The user 102 may adjust that context so that the "news" hotword is active from 8:00 am to noon.

The control interface may also indicate that the hotwords "next," "stop," or "back" are active when music is playing. The user 102 may update the hotwords for the music playing context to only be "next" and "stop." In some implementations, the control interface may also provide the user 102 the capability to add custom hotwords for existing or custom contexts. For example, the user 102 may input into the control interface "call mom" as a hotword, always have the hotword active, and upon detecting the hotword to call the contact "mom." The user 102 may also add "up" and "down" to the music playing context and specify that the hotwords control the volume. The user may also add a new context that corresponds to the time period 11:00 am to 1:00 pm. The user may add the hotword "order lunch" to be active during that time period and indicate that the hotword is to open a food ordering application.

At stage F, the user 102 speaks the utterance 146 that includes the hotword 148. The computing device 104 receives the utterance 146 through the microphone and processes the corresponding audio data. The hotword detector 108 compares the hotword models 114 of the active hotwords 112 to identify whether the utterance 146 includes any active hotwords. If the hotword detector 108 identifies a hotword, then the computing device performs the corresponding command. In the example shown in FIG. 1, the user 102 speaks "next." The active hotwords 112 may be "stop," "next," and "back." The hotword detector 108 compares the audio data that corresponds to utterance 146 to the hotword models 114 that correspond to "stop," "next," and "back" and determines that the utterance 146 includes the hotword "next." Based on detecting the hotword "next" that corresponds to the instruction to advance to the next song, the computing device advances to the next song 150 at stage G.

In some implementations, the hotword detector 108 may detect hotwords that are not among the active hotwords 112 but whose models are still stored in the hotword models. In this instance, the hotword detector 108 may provide an indication to the user interface generator 144 to generate a user interface indicating that the hotword is not currently active. For example, the user 102 may speak "play" when the music is playing. The hotword detector 108 may identify the hotword "play." Because the hotword is not active the computing device 104 performs no action. However, the user interface generator 144 may generate an interface indicating that the hotword "play" is not active and indicating the active hotwords are "stop," "next," and "back."

In some implementations, the computing device 104 may still be configured to identify the default hotword "ok computer." In this instance, the computing device 104 may process the audio data that follows "ok computer" using speech recognition and execute the appropriate action based on transcription of the subsequent audio data. For example, if the user 102 speaks "ok computer, next" while music is playing, then the computing device 104 advances to the next song after identifying the "ok computer" hotword and transcribing the subsequent portion of the audio data that includes the command "next."

Similarly, the contextual hotwords can be followed by commands. Continuing with the "order lunch" example, the user 102 may speak "order lunch from Sandwich Deli" during the time when the hotword is active. In this instance, the hotword detector 108 identifies the "order lunch" hotword. The speech recognizer 116 generates the transcription "from Sandwich Deli." The computing device 104 may open the food ordering application and open the Sandwich Deli menu.

In some implementations, the hotword detector 108 generates a hotword confidence score for each initial portion of processed audio data. If the hotword confidence score satisfies a threshold, then the hotword detector 108 determines that the audio data includes the hotword. For example, if the hotword confidence score is 0.9 and the hotword confidence threshold is 0.8, then the hotword detector 108 determines that the audio data includes the hotword.

In some implementations, if the hotword confidence score is with a range below the threshold, then the user interface generator 144 may generate an interface asking for confirmation that the user 102 spoke the hotword. For example, the hotword confidence score may be 0.7. If the range is between 0.6 and 0.8, then the user interface generator 144 may generate a user interface requesting that the user 102 confirm or repeal the hotword. In some implementations and if the user 102 confirms that the user 102 spoke the hotword, the computing device 104 may use the audio data to update the hotword model to improve performance in the future. The computing device 104 may not use the audio data if there is too much noise in the audio data.

Figure 2:
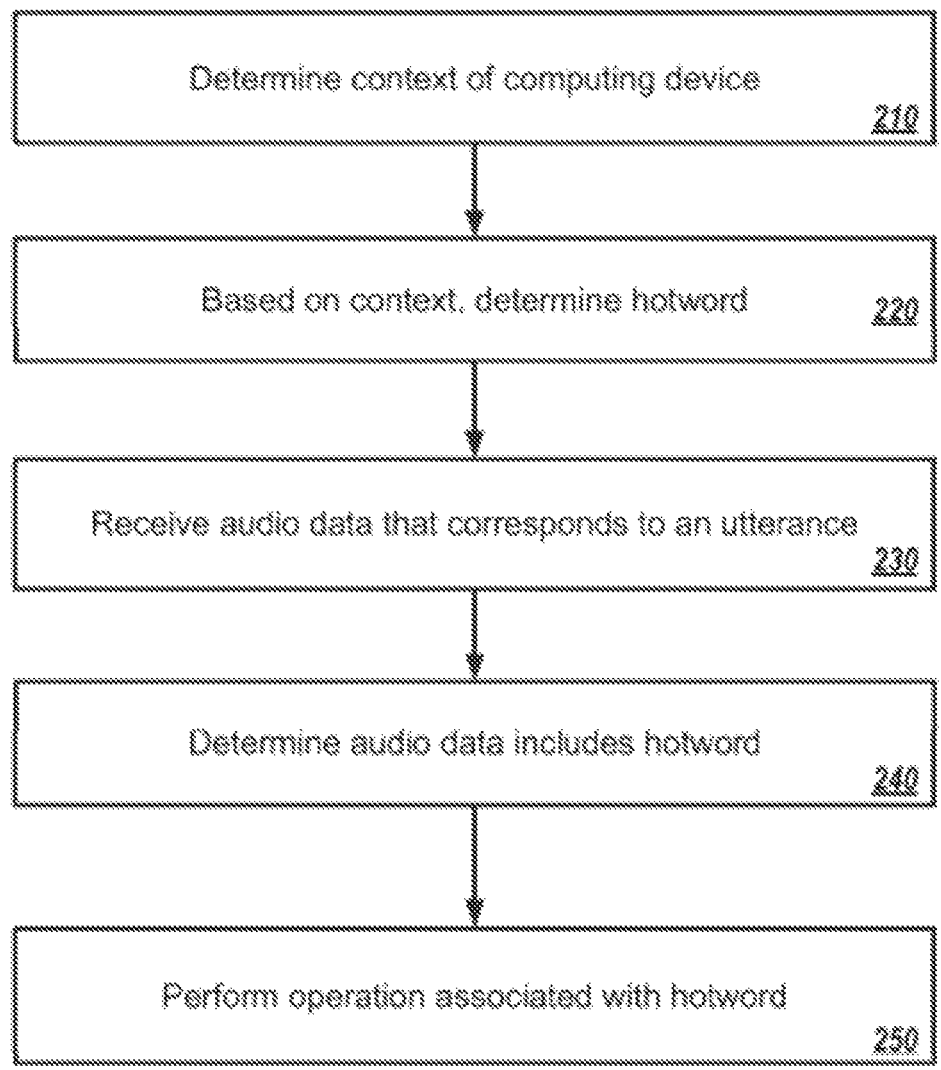
FIG. 2 illustrates an example process for identifying and processing contextual hotwords.

FIG. 2 illustrates an example process 200 for identifying and processing contextual hotwords. In general, the process 200 identifies hotwords based on a context of the device and assigns actions to the hotwords so that when a user speaks the hotword, the process performs the corresponding action. The process 200 will be described as being performed by a computer system comprising at one or more computers, for example, system 100 as shown in FIG. 1.

The system determines a context associated with the computing device (210). In some implementations, the system identifies an application that is running on the system. The system determines the context based on the application that is running on the system. For example, the application may be a music application. In this case, the context may be playing music. The system may also distinguish between applications running in the background and the foreground. For example, the music application running and playing music in the background or the foreground may still have the same context of playing music. An application such as a browser running in the background may not affect the context. In some implementations, the context may also be related to a state of the device such as when the device is locked. The context may also be related to what is displayed on the screen, for example, "home screen."

In some implementations, the context may be based on the movement of the system. For example, if the system is moving at speeds that are similar to a car, then the system may determine that the context is "in a car." In some implementations, the context may be based on a location of the computing device. For example, the system may be located at a home of the user. In this case, the context of the device may be "at home." In some implementations, the context may be a combination of contexts. For example, the context may be "locked at home" for when the system is locked and at the home of the user.

The system, based on the context associated with the system, determines a hotword (220). In some implementations, system determines a hotword based on hotwords identified in software. For example, the music application may identify hotwords for when the context is "music playing" and when the music is stopped and the music application is open.

In some implementations, the system may determine hotwords based on prior use. For example, if the user typically reads the news during a certain time range, then the system may determine the hotword "news" for when the context is in that time range. In some implementations, the system may display the hotword and indicate in the display the action performed by the hotword. The system may provide notification when the hotword becomes active and when the system deactivates it.

The system, after determining the hotword, receives audio data that corresponds to an utterance (230). In some implementations, the system requests a hotword model for the hotword from a server, and the system determines the hotword. For example, if the system determines the hotword "next," then the system may request from a server a hotword model for "next."

The system determines that the audio data includes the hotword (240). In some implementations, the system determines that the audio data includes the hotword without performing speech recognition on the audio data. In some implementations, the system determines that the audio data includes the hotword by extracting audio features of the audio data that corresponds to the utterance. The system generates a hotword confidence score by processing the audio features and possibly by comparing the audio features to those in a hotword model.

If the hotword confidence score satisfies a hotword confidence threshold, then the system determines that the audio data includes the hotword. If the hotword confidence score does not satisfy the hotword confidence threshold, then the system determines that the audio data does not include the hotword. For example, if the hotword confidence threshold is 0.8, then audio data with a hotword confidence score above 0.8 would be labeled as including the hotword and audio data with hotword confidence score below 0.8 would be labeled as not including the hotword.

In some implementations, the audio data only includes the hotword. For example, the user may only speak "next," which is a hotword. In some implementations, an initial portion of the audio data includes the hotword. For example, the hotword may be "order lunch" and the user may speak "order lunch from Sandwich Deli." In this instance, the system identifies the hotword "order lunch" and processes the portion of the audio data that follows the hotword using speech recognition.

The system, in response to determining that the audio data includes the hotword, performs an operation associated with the hotword (250). In some implementations, the system identifies the action using the hotword. For example, when music is playing and the user speaks "next," the system advances the song.

In some implementations, the system removes a hotword from the active hotwords list when the context is no longer valid. For example, if the user stops playing music, then the system removes the hotword "next" from the list of active hotwords. If a user speaks "next" in this case, then the system performs no action in response to "next."

In some implementations, the operation may be based on the hotword and any audio data that follows the hotword or only on the audio data that follows the hotword. For example, an active hotword may be "directions" and the user may speak "directions home." In this case, the system may open the mapping application and begin to provide the user directions to the user's home.

In some implementations, the operation may be dependent on the audio data that follows a hotword. There may be instances where an active hotword may have different operations depending on the audio data that follows the hotword. For example, a user may be at home and the system may be playing music. The user being at home may cause the system to activate the hotword "increase" to increase the temperature of the thermostat. The system playing music may also cause the system to activate the hotword "increase" to increase the volume of the music. In this case, the system may alleviate this conflict in one or more of the following ways.

The system may update the hot words to be "increase temperature" and "increase volume". The system may display an indication on the screen if the user says "increase" that the user should speak "increase volume" to increase the music volume or "increase temperature" to increase the temperature of the thermostat. Alternatively, the system may keep "increase" as a hotword and require an argument after the "increase" where the system performs speech recognition on any audio data after "increase" or request clarification from the user. For example, the user may speak "increase." The system may display a request or play synthesized speech of the request for the user to clarify what to increase.

In some implementations, the system may perform detect active hotwords in the presence of an argument or suffix to the spoken hotword, sometimes only in the presence of an argument or suffix to the spoken hotword. For example, an active hotword may be "set alarm." The system may only acknowledge the hotword "set alarm" when it is followed by an argument such as "for 6:00 am" or "for tomorrow morning." In this case, the system may perform speech recognition on the portion of the audio data that follows the hotword and not acknowledge the hotword unless the hotword is followed by additional spoken terms. In some implementations, the additional spoken terms are arguments that the hotword accepts. The hotword "set alarm" may accept arguments such as "for 6:00 am" but not "tuna sandwich."

In some implementations, the system may determine that the audio data includes more than one hotword. This may happen because currently active hotwords sound similar. For example, two active hotwords may be "next" and "text." In some implementations, the system may only determine that the audio data includes a hotword, not necessarily which hotword. If the system determines that two or more hotword models match the audio data, then the system may perform speech recognition on the portion of the audio data that includes the hotword to determine what hotword the user spoke.

Figure 3:
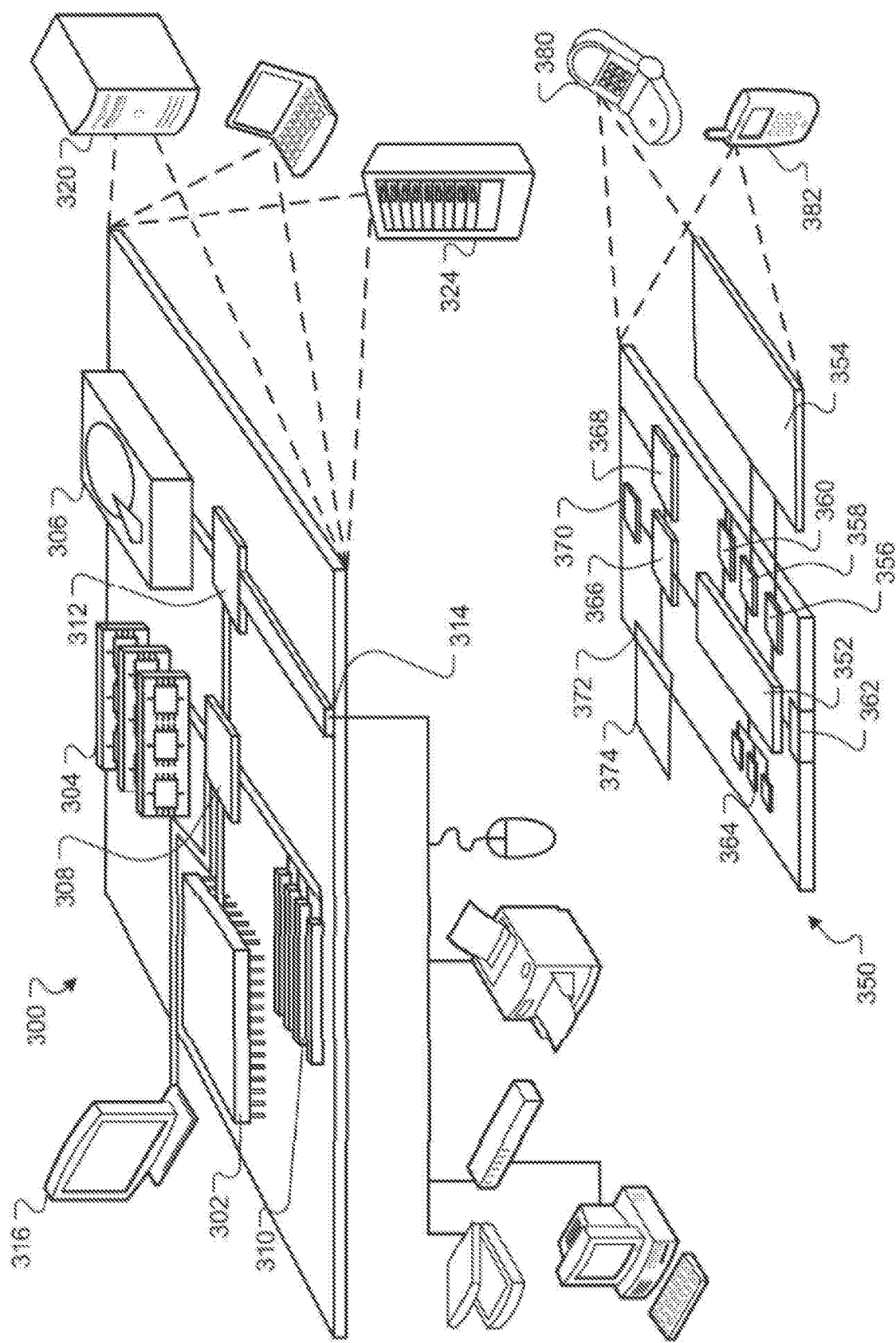
FIG. 3 illustrates an example of a computing device and a mobile computing device.

FIG. 3 shows an example of a computing device 300 and a mobile computing device 350 that can be used to implement the techniques described here. The computing device 300 is intended to represent various forms of digital computers, such as laptops, desktops, workstations, personal digital assistants, servers, blade servers, mainframes, and other appropriate computers. The mobile computing device 350 is intended to represent various forms of mobile devices such as personal digital assistants, cellular telephones, smart-phones, and other similar computing devices. The components shown here, their connections and relationships, and their functions, are meant to be examples only, and are not meant to be limiting.

The computing device 300 includes a processor 302, a memory 304, a storage device 306, a high-speed interface 308 connecting to the memory 304 and multiple high-speed expansion ports 310, and a low-speed interface 312 connecting to a low-speed expansion port 314 and the storage device 306. Each of the processor 302, the memory 304, the storage device 306, the high-speed interface 308, the high-speed expansion ports 310, and the low-speed interface 312, are interconnected using various busses, and may be mounted on a common motherboard of in other manners as appropriate. The processor 302 can process instructions for execution within the computing device 300, including instructions stored in the memory 304 or on the storage device 306 to display graphical information for a GUI on an external input/output device, such as a display 316 coupled to the high-speed interface 308. In other implementations, multiple processors and/or multiple buses may be used, as appropriate, along with multiple memories and types of memory. Also multiple computing devices may be connected, with each device providing portions of the necessary operations (e.g., as a server bank, a group of blade servers, or a multi-processor system).

The memory 304 stores information within the computing device 300. In some implementations, the memory 304 is a volatile memory unit or units. In some implementations, the memory 304 is a non-volatile memory unit or units. The memory 304 may also be another form of computer-readable medium such as a magnetic or optical disk.

The storage device 306 is capable of providing mass storage for the computing device 300. In some implementations, the storage device 306 may be or contain a computer-readable medium, such as a floppy disk device, a hard disk device, an optical disk device, or a tape device, a flash memory or other similar solid state memory device, or an array of devices, including devices in a storage area network or other configurations. Instructions can be stored in an information carrier. The instructions, when executed by one or more processing devices (for example, processor 302), perform one or more methods, such as those described above. The instructions can also be stored by one or more storage devices such as computer- or machine-readable mediums (for example, the memory 304, the storage device 306, or memory on the processor 302).

The high-speed interface 308 manages bandwidth-intensive operations for the computing device 300, while the low-speed interface 312 manages lower bandwidth-intensive operations. Such allocation of functions is an example only. In some implementations, the high-speed interface 308 is coupled to the memory 304, the display 316 (e.g., through a graphics processor or accelerator), and to the high-speed expansion ports 310, which may accept various expansion cards. In the implementation, the low-speed interface 312 is coupled to the storage device 306 and the low-speed expansion port 314. The low-speed expansion port 314, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 300 may be implemented in a number of different forms, as shown in the figure. For example, it may be implemented as a standard server 320, or multiple times in a group of such servers. In addition, it may be implemented in a personal computer such as a laptop computer 322. It may also be implemented as part of a rack server system 324. Alternatively, components from the computing device 300 may be combined with other components in a mobile device such as a mobile computing device 350. Each of such devices may contain one or more of the computing device 300 and the mobile computing device 350, and an entire system may be made up of multiple computing devices communicating with each other.

The mobile computing device 350 includes a processor 352, a memory 364, an input/output device such as a display 354, a communication interface 366, and a transceiver 368, among other components. The mobile computing device 350 may also be provided with a storage device, such as a micro-drive or other device, to provide additional storage. Each of the processor 352, the memory 364, the display 354, the communication interface 366, and the transceiver 368, are interconnected using various buses, and several of the components may be mounted on a common motherboard or in other manners as appropriate.

The processor 352 can execute instructions within the mobile computing device 350, including instructions stored in the memory 364. The processor 352 may be implemented as a chipset of chips that include separate and multiple analog and digital processors. The processor 352 may provide, for example, for coordination of the other components of the mobile computing device 350, such as control of user interfaces, applications run by the mobile computing device 350, and wireless communication by the mobile computing device 350.

The processor 352 may communicate with a user through a control interface 358 and a display interface 356 coupled to the display 354. The display 354 may be, for example, a TFT (Thin-Film-Transistor Liquid Crystal Display) display or an OLED (Organic Light Emitting Diode) display, or other appropriate display technology. The display interface 356 may comprise appropriate circuitry for driving the display 354 to present graphical and other information to a user. The control interface 358 may receive commands from a user and convert them for submission to the processor 352. In addition, an external interface 362 may provide communication with the processor 352, so as to enable near area communication of the mobile computing device 350 with other devices. The external interface 362 may provide, for example, for wired communication in some implementations, or for wireless communication in other implementations, and multiple interfaces may also be used.

The memory 364 stores information within the mobile computing device 350. The memory 364 can be implemented as one or more of a computer-readable medium or media, a volatile memory unit or units, or a non-volatile memory unit or units. An expansion memory 374 may also be provided and connected to the mobile computing device 350 through an expansion interface 372, which may include, for example, a SIMM (Single In Line Memory Module) card interface. The expansion memory 374 may provide extra storage space for the mobile computing device 350, or may also store applications or other information for the mobile computing device 350. Specifically, the expansion memory 374 may include instructions to carry out or supplement the processes described above, and may include secure information also. Thus, for example, the expansion memory 374 may be provided as a security module for the mobile computing device 350, and may be programmed with instructions that permit secure use of the mobile computing device 350. In addition, secure applications may be provided via the SIMM cards, along with additional information, such as placing identifying information on the SIMM card in a non-hackable manner.

The memory may include, for example, flash memory and/or NVRAM memory (non-volatile random access memory), as discussed below. In some implementations, instructions are stored in an information carrier, that the instructions, when executed by one or more processing devices (for example, processor 352), perform one or more methods, such as those described above. The instructions can also be stored by one or more storage devices, such as one or more computer- or machine-readable mediums (for example, the memory 364, the expansion memory 374, or memory on the processor 352). In some implementations, the instructions can be received in a propagated signal, for example, over the transceiver 368 or the external interface 362.

The mobile computing device 350 may communicate wirelessly through the communication interface 366, which may include digital signal processing circuitry where necessary. The communication interface 366 may provide for communications under various modes or protocols, such as GSM voice calls (Global System for Mobile communications), SMS (Short Message Service), EMS (Enhanced Messaging Service), or MMS messaging (Multimedia Messaging Service), CDMA (code division multiple access), TDMA (time division multiple access), PDC (Personal Digital Cellular), WCDMA (Wideband Code Division Multiple Access), CDMA2000, or GPRS (General Packet Radio Service), among others. Such communication may occur, for example, through the transceiver 368 using a radio-frequency. In addition short-range communication may occur, such as using a Bluetooth, WiFi, or other such transceiver. In addition, a GPS (Global Positioning System) receiver module 370 may provide additional navigation- and location-related wireless data to the mobile computing device 350, which may be used as appropriate by applications running on the mobile computing device 350.

The mobile computing device 350 may also communicate audibly using an audio codec 360, which may receive spoken information from a user and convert it to usable digital information. The audio codec 360 may likewise generate audible sound for a user, such as through a speaker, e.g., in a handset of the mobile computing device 350. Such sound may include sound from voice telephone calls, may include recorded sound (e.g., voice messages, music files, etc.) and may also include sound generated by applications operating on the mobile computing device 350.

The mobile computing device 350 may be implemented in a number of different forms, as shown in the figure. For example, it may be implemented as a cellular telephone 380. It may also be implemented as part of a smart-phone 382, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms machine-readable medium and computer-readable medium refer to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term machine-readable signal refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware or front end components. The components of the system can be interconnected by any form or medium of digital data communication (e.g., a communication network). Examples of communication networks include a local area network (LAN), a wide area network (WAN), and the Internet.

The computing system can include clients and servers. A client and server are generally remote from each other and typically interact through a communication network. The relationship of client and server arises by virtue of computer programs running on the respective computers and having a client-server relationship to each other.

Although a few implementations have been described in detail above, other modifications are possible. For example, while a client application is described as accessing the delegate(s), in other implementations the delegate(s) may be employed by other applications implemented by one or more processors, such as an application executing on one or more servers. In addition, the logic flows depicted in the figures do not require the particular order shown, or sequential order, to achieve desirable results. In addition, other actions may be provided, or actions may be eliminated, from the described flows, and other components may be added to, or removed from, the described systems. Accordingly, other implementations are within the scope of the following claims.

What is claimed is:

1. A method comprising:
    receiving, at data processing hardware of a computing device, audio data corresponding to a first utterance spoken by a user associated with the computing device, the first utterance comprising a default hotword followed by a command to playback music from the computing device;

detecting, by the data processing hardware, the default hotword in the audio data corresponding to the first utterance spoken by the user, the detection of the default hotword in the audio data causing a speech recognizer to perform speech recognition on the audio data to identify the command to playback the music from the computing device;

in response to the speech recognizer performing speech recognition on the audio data to identify the command to playback the music, executing, by the data processing hardware, the command to playback the music from the computing device; and during playback of the music from the computing device:
activating, by the data processing hardware, a set of additional hotwords each associated with a respective action for controlling the playback of the music from the computing device;
restricting, by the data processing hardware, the activated set of additional hotwords to a subset of the activated set of additional hotwords based on a playback state during the playback of the music from the computing device;
receiving, at the data processing hardware, additional audio data corresponding to a second utterance spoken by the user, the second utterance comprising one of the additional hotwords in the subset of the activated set of additional hotwords;
detecting, by the data processing hardware, the additional hotword in the additional audio data corresponding to the second utterance spoken by the user; and
based on detecting the additional hotword in the additional audio data corresponding to the second utterance, performing, by the data processing hardware, the respective action associated with the detected additional hotword for controlling the playback of the music from the computing device.

2. The method of claim 1, wherein detecting the default hotword in the audio data corresponding to the first utterance comprises detecting the default hotword in the audio data without performing speech recognition on the audio data.

3. The method of claim 1, wherein the speech recognizer executes on the data processing hardware of the computing device.

4. The method of claim 1, further comprising, in response to detecting the default hotword in the audio data corresponding to the first utterance spoken by the user, providing, by the data processing hardware, the audio data corresponding to the first utterance to a server in communication with the data processing hardware, the server executing the speech recognizer to perform the speech recognition on the audio data to identify the command to playback the music from the computing device.

5. The method of claim 1, wherein detecting the additional hotword in the additional audio data corresponding to the second utterance comprises detecting the additional hotword in the additional audio data without performing speech recognition on the additional audio data.

6. The method of claim 1, wherein detecting the additional hotword in the additional audio data corresponding to the second utterance comprises:
extracting audio features of the additional audio data that corresponds to the second utterance;
generating, using a hotword detector, hotword confidence score by processing the extracted audio features;
determining, by the hotword detector, whether the hotword confidence score satisfies a hotword confidence threshold; and
when the hotword confidence score satisfies the hotword confidence threshold, determining, by the hotword detector, that the additional audio data corresponding to the second utterance includes the additional hotword.

7. The method of claim 6, further comprising, when the hotword confidence score fails to satisfy the hotword confidence threshold:
determining, by the hotword detector, that the additional audio data does not include the additional audio data corresponding to the second utterance does not include the additional hotword; and
bypassing, by the data processing hardware, performing the respective action for controlling the playback of the music from the computing device.

8. The method of claim 1, wherein the second utterance only comprises the one of the additional hotwords in the subset of the activated set of additional hotwords.

9. The method of claim 1, wherein each additional hotword in the activated set of additional hotwords is associated with a respective hotword model configured to recognize audio of the respective additional hotword.

10. The method of claim 1, further comprising storing, by the data processing hardware, multiple hotword models on memory hardware of the computing device, each hotword model of the multiple hotword models associated with a respective one of the additional hotwords in the activated set of additional hotwords that is configured to recognize audio of the respective one of the additional hotwords.

11. A computing device comprising:
data processing hardware; and
memory hardware in communication with the data processing hardware and storing instructions that when executed by the data processing hardware cause the data processing hardware to perform operations comprising:
receiving audio data corresponding to a first utterance spoken by a user associated with the computing device, the first utterance comprising a default hotword followed by a command to playback music from the computing device;
detecting the default hotword in the audio data corresponding to the first utterance spoken by the user, the detection of the default hotword in the audio data causing a speech recognizer to perform speech recognition on the audio data to identify the command to playback the music from the computing device;
in response to the speech recognizer performing speech recognition on the audio data to identify the command to playback the music, executing the command to playback the music from the computing device; and
during playback of the music from the computing device:
activating a set of additional hotwords each associated with a respective action for controlling the playback of the music from the computing device;
restricting the activated set of additional hotwords to a subset of the activated set of additional hotwords based on a playback state during the playback of the music from the computing device;
receiving additional audio data corresponding to a second utterance spoken by the user, the second utterance comprising one of the additional hotwords in the subset of the activated set of additional hotwords;

detecting the additional hotword in the additional audio data corresponding to the second utterance spoken by the user; and based on detecting the additional hotword in the additional audio data corresponding to the second utterance, performing the respective action associated with the detected additional hotword for controlling the playback of the music from the computing device.

12. The computing device of claim 11, wherein detecting the default hotword in the audio data corresponding to the first utterance comprises detecting the default hotword in the audio data without performing speech recognition on the audio data.

13. The computing device of claim 11, wherein the speech recognizer executes on the data processing hardware of the computing device.

14. The computing device of claim 11, wherein the operations further comprise, in response to detecting the default hotword in the audio data corresponding to the first utterance spoken by the user, providing the audio data corresponding to the first utterance to a server in communication with the data processing hardware, the server executing the speech recognizer to perform the speech recognition on the audio data to identify the command to playback the music from the computing device.

15. The computing device of claim 11, wherein detecting the additional hotword in the additional audio data corresponding to the second utterance comprises detecting the additional hotword in the additional audio data without performing speech recognition on the additional audio data.

16. The computing device of claim 11, wherein detecting the additional hotword in the additional audio data corresponding to the second utterance comprises:

extracting audio features of the additional audio data that corresponds to the second utterance;

generating, using a hotword detector, hotword confidence score by processing the extracted audio features;

determining, by the hotword detector, whether the hotword confidence score satisfies a hotword confidence threshold; and when the hotword confidence score satisfies the hotword confidence threshold, determining, by the hotword detector, that the additional audio data corresponding to the second utterance includes the additional hotword.

17. The computing device of claim 16, wherein the operations further comprise, when the hotword confidence score fails to satisfy the hotword confidence threshold:

determining, by the hotword detector, that the additional audio data does not include the additional audio data corresponding to the second utterance does not include the additional hotword; and bypassing performing the respective action for controlling the playback of the music from the computing device.

18. The computing device of claim 11, wherein the second utterance only comprises the one of the additional hotwords in the subset of the activated set of additional hotwords.

19. The computing device of claim 11, wherein each additional hotword in the activated set of additional hotwords is associated with a respective hotword model configured to recognize audio of the respective additional hotword.

20. The computing device of claim 11, wherein the operations further comprise storing multiple hotword models on the memory hardware of the computing device, each hotword model of the multiple hotword models associated with a respective one of the additional hotwords in the activated set of additional hotwords that is configured to recognize audio of the respective one of the additional hotwords.

* * * * *